United States Patent
Wu (10) Patent No.: US 8,150,222 B2
(45) Date of Patent: Apr. 3, 2012

(54) OPTICAL FIBER CONNECTOR

(75) Inventor: Kun-Chan Wu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 280 days.

(21) Appl. No.: 12/693,364

(22) Filed: Jan. 25, 2010

(65) Prior Publication Data
US 2011/0150391 A1    Jun. 23, 2011

(30) Foreign Application Priority Data
Dec. 21, 2009  (TW) ................................ 98143830 A (51) Int. Cl.
*G02B 6/32* (2006.01)
(52) U.S. Cl. ........................................... 385/33; 385/74
(58) Field of Classification Search .................. 385/33, 385/74
See application file for complete search history.

(56) References Cited

U.S. PATENT DOCUMENTS

| 2005/0013578 A1* | 1/2005 | Inui et al. ...................... 385/134 |
| 2011/0064358 A1* | 3/2011 | Nishimura ...................... 385/33 |

* cited by examiner

*Primary Examiner* — Hemang Sanghavi
(74) *Attorney, Agent, or Firm* — Altis Law Group, Inc.

(57) ABSTRACT

An exemplary optical fiber connector includes a socket and a plug for insertion in the socket. The plug includes a first sidewall, an opposite second sidewall, a plurality of first fiber engaging holes formed in each of the first and second sidewalls, and a plurality of first converging lenses located in each of the first and second sidewalls, aligning with the respective first fiber engaging holes. The socket includes a fourth sidewall, an opposite fifth sidewall, a plurality of second fiber engaging holes formed in each of the fourth and fifth sidewalls, and a plurality of second converging lenses located in each of the fourth and fifth sidewalls, aligning with the respective second fiber engaging holes. The first converging lenses align with and directly face the respective second converging lenses.

14 Claims, 8 Drawing Sheets

OPTICAL FIBER CONNECTOR

BACKGROUND

1. Technical Field

The present disclosure relates to connectors, and particularly, to an optical fiber connector.

2. Description of Related Art

Optical fiber connectors are connectors for optical fibers, which are widely used in optical fiber communication systems.

A typical optical fiber connector provides only mechanical structures for locking two optical fibers together, thus resulting light transmission loss in the connector. Furthermore, each of such optical fiber connectors can only connect a pair of optical fibers.

What is needed, therefore, is an optical fiber connector, which can overcome the above shortcoming.

BRIEF DESCRIPTION OF THE DRAWINGS

Many aspects of the present optical fiber connector can be better understood with reference to the following drawings. The components in the drawings are not necessarily drawn to scale, the emphasis instead being placed upon clearly illustrating the principles of the present optical fiber connector. Moreover, in the drawings, like reference numerals designate corresponding parts throughout the several views.

DETAILED DESCRIPTION

Embodiment of the present optical fiber connector will now be described in detail below and with reference to the drawings.

Figure 1:
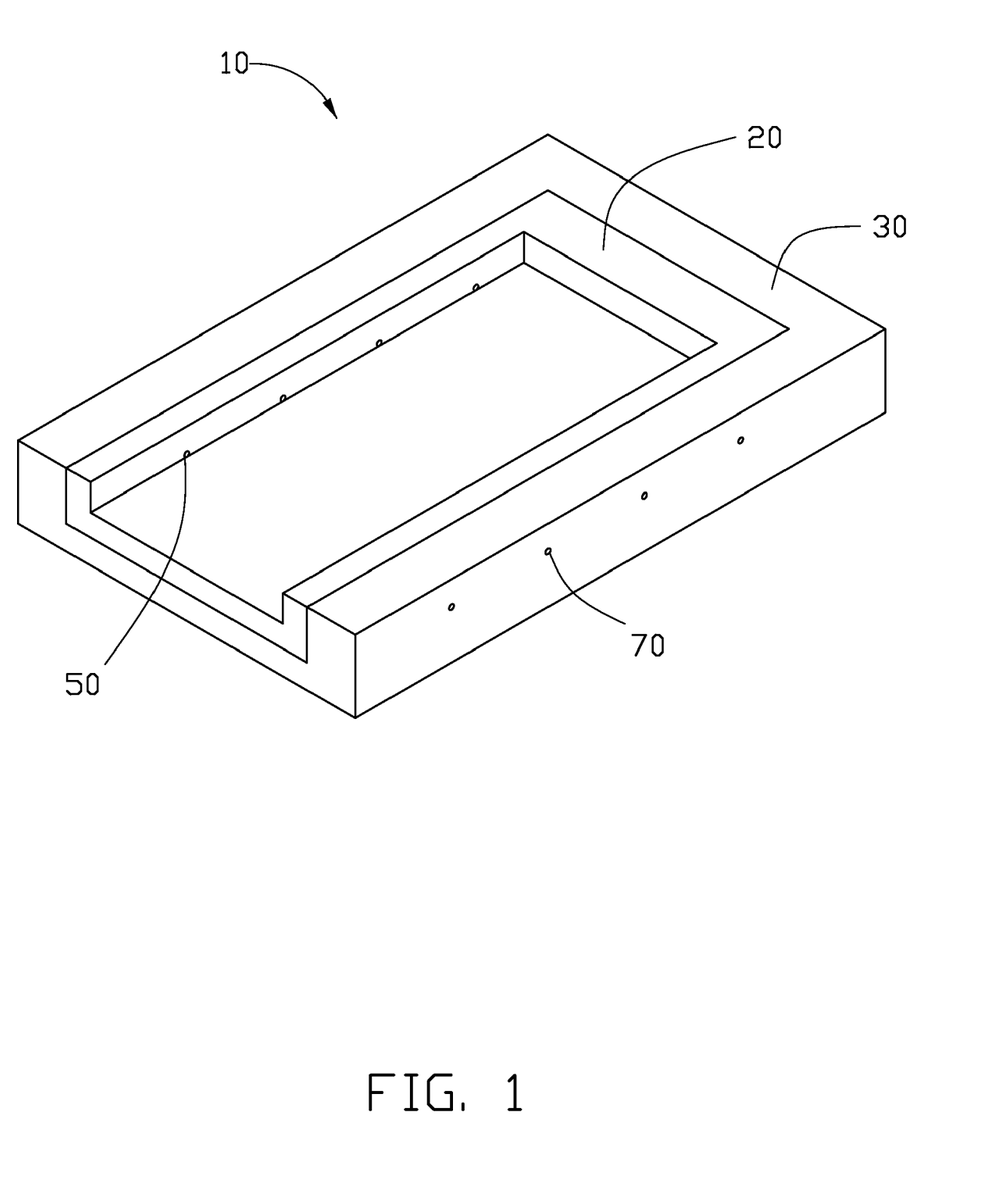
FIG. 1 is an isometric view of an optical fiber connector in accordance with an embodiment, the optical fiber connector including a socket and a plug.

Referring to FIG. 1, an optical fiber connector 10 in accordance with an embodiment, is shown. The connector 10 includes a socket 30, and a plug 20 for insertion into the socket 30.

Figure 2:
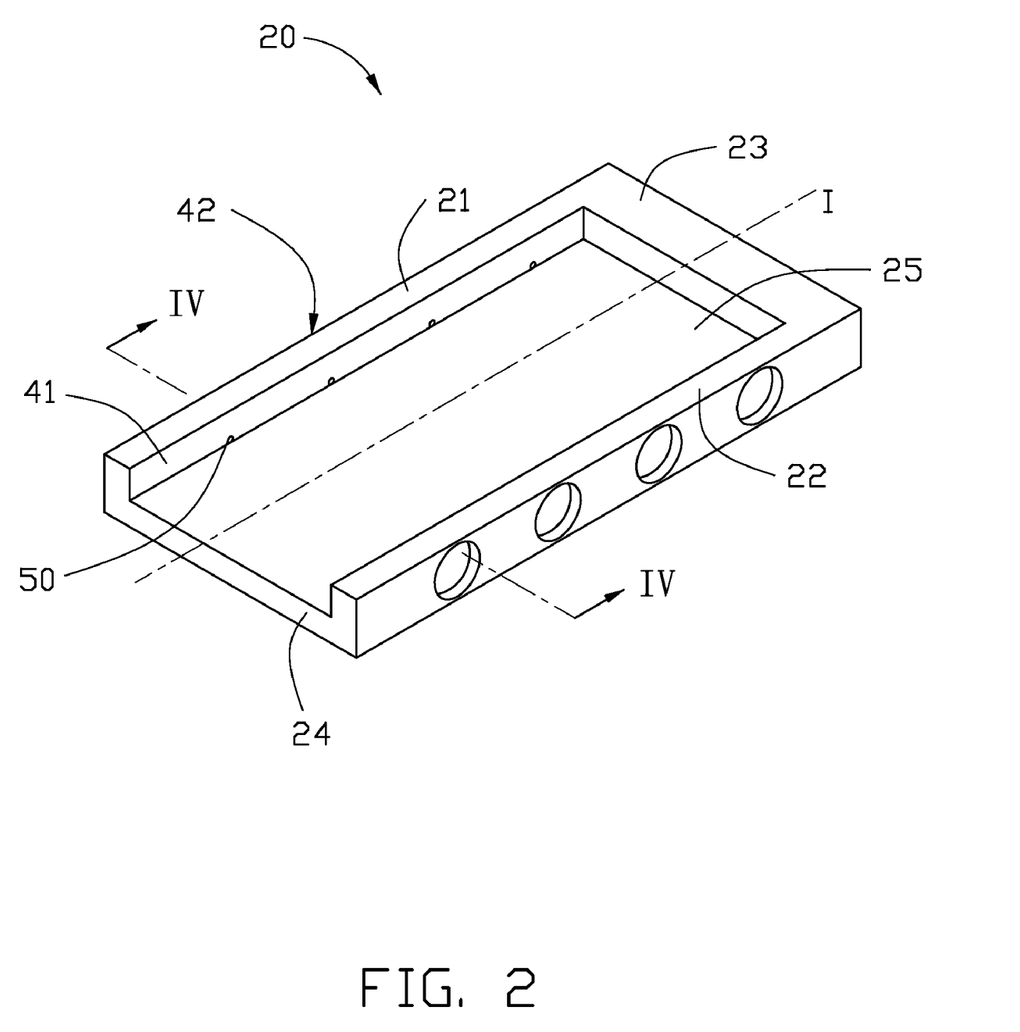
FIG. 2 is an isometric view of the plug of FIG. 1.

Referring also to FIG. 2, the plug 20 includes a first sidewall 21, a second sidewall 22, a third sidewall 23 interconnecting the first and second sidewalls 21, 22, and a bottom wall 24 interconnecting all the sidewalls 21, 22, 23. The sidewalls 21, 22, 23 and the bottom wall 24 cooperatively define a first receiving space 25 therein. The first and second sidewalls 21, 22 are parallel with each other and are perpendicular to the third sidewall 23.

Figure 3:
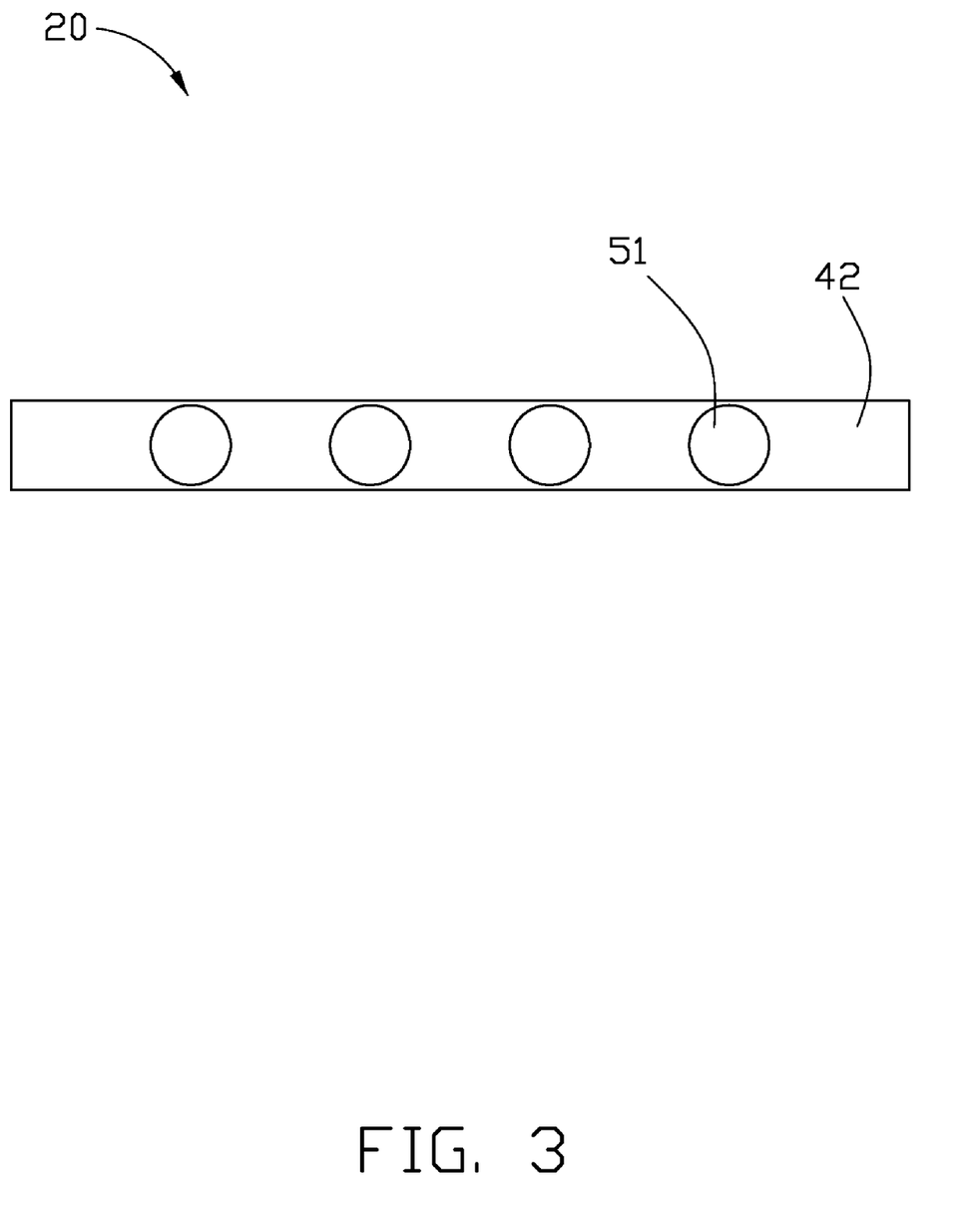
FIG. 3 is a side view of the plug shown in FIG. 2.
Figure 4:
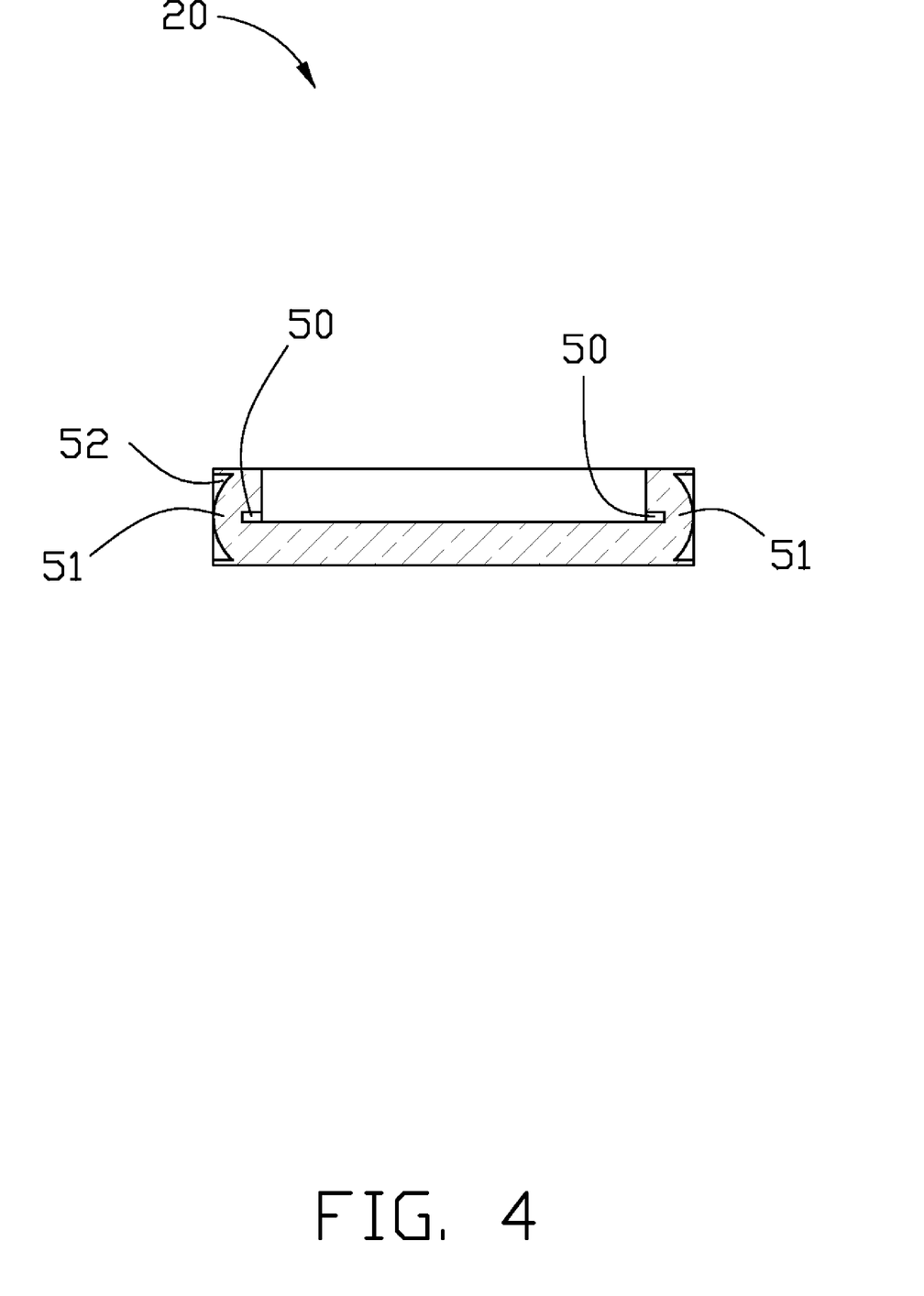
FIG. 4 is a cross-sectional view of the plug shown in FIG. 2, taken along the line IV-IV.

In the present embodiment, the first and second sidewalls 21, 22 are symmetrical about a central line I (see FIG. 2) of the bottom wall 24 and the third sidewall 23. To be convenient, only the first sidewall 21 is described in detail herein. Also referring to FIGS. 3 and 4, the first sidewall 21 has a first surface 41 facing the first receiving space 25, and an opposite second surface 42. The first surface 41 has a plurality of first fiber engaging holes 50 formed therein. The second surface 42 has a plurality of first converging lenses 51 located therein. Each of the first converging lenses 51 is a convex lens with a single convex surface, and is located within a hole 52 formed in the second surface 42. Each of the first converging lenses 51 aligns with one of the first fiber engaging holes 50, and an end of each of the first fiber engaging holes 50 is located at a focus of the corresponding first converging lens 51. In the present embodiment, the entire plug 20 is made of a same transparent material, and the first converging lenses 51 are integrally formed with the first sidewall 21.

Figure 5:
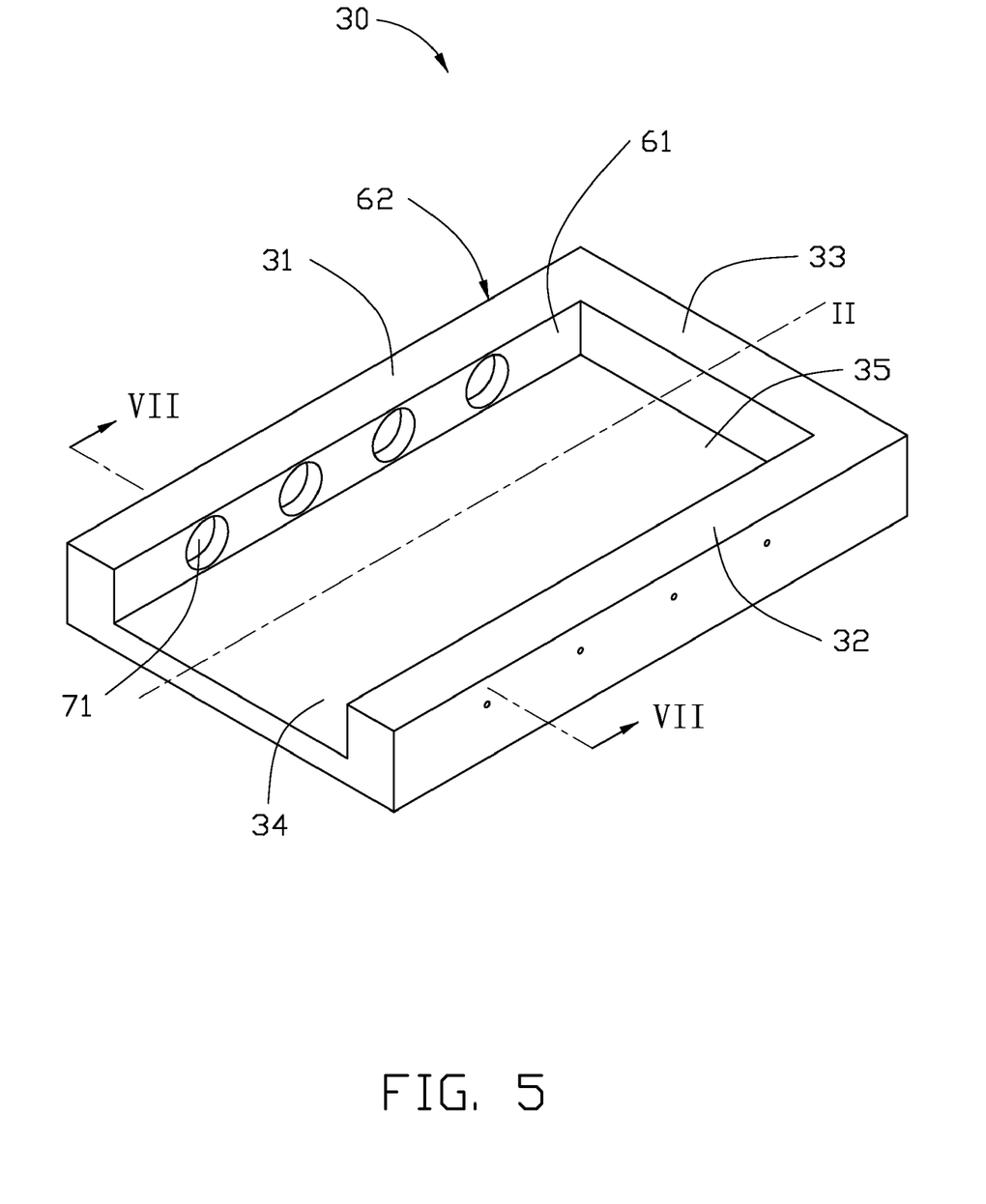
FIG. 5 is an isometric view of the socket of FIG. 1.

Referring to FIG. 5, the socket 30 includes a fourth sidewall 31, a fifth sidewall 32, a sixth sidewall 33 interconnecting the fourth and fifth sidewalls 31, 32, and a bottom wall 34 interconnecting all the sidewalls 31, 32, 33. The sidewalls 31, 32, 33 and the bottom wall 34 cooperatively define a second receiving space 35 therein. The fourth and fifth sidewalls 31, 32 are parallel with each other and are perpendicular to the sixth sidewall 33.

Figure 6:
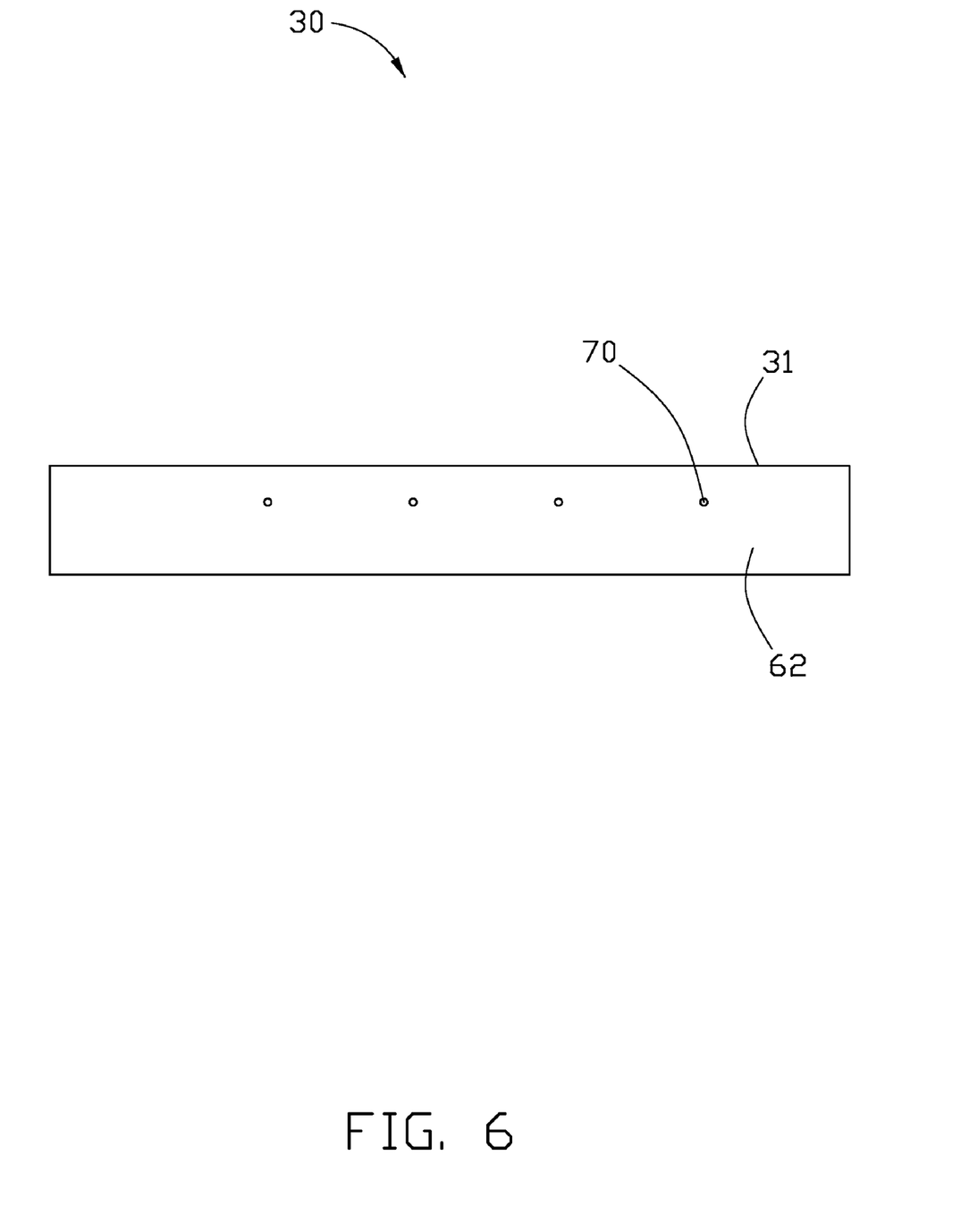
FIG. 6 is a side view of the socket shown in FIG. 5.

In the present embodiment, the fourth and fifth sidewalls 31, 32 are symmetrical about a central line II (see FIG. 5) of the bottom wall 34 and the sixth sidewall 33. To be convenient, only the fourth sidewall 31 is described in detail herein. Also referring to FIGS. 6 and 7, the fourth sidewall 31 has a first surface 61 facing the second receiving space 35, and an opposite second surface 62. The first surface 61 has a plurality of second converging lenses 71 located therein. The second surface 42 has a plurality of second fiber engaging holes 70 formed therein. Each of the second converging lenses 71 is also a convex lens with a single convex surface, and is located within a hole 72 formed in the first surface 61. Each of the second converging lenses 71 aligns with one of the second fiber engaging holes 70, and an end of each of the second fiber engaging holes 70 is located at a focus of the corresponding second converging lens 71. In the present embodiment, the entire socket 30 is made of a same transparent material, and the second converging lenses 71 are integrally formed with the fourth sidewall 31.

Figure 7:
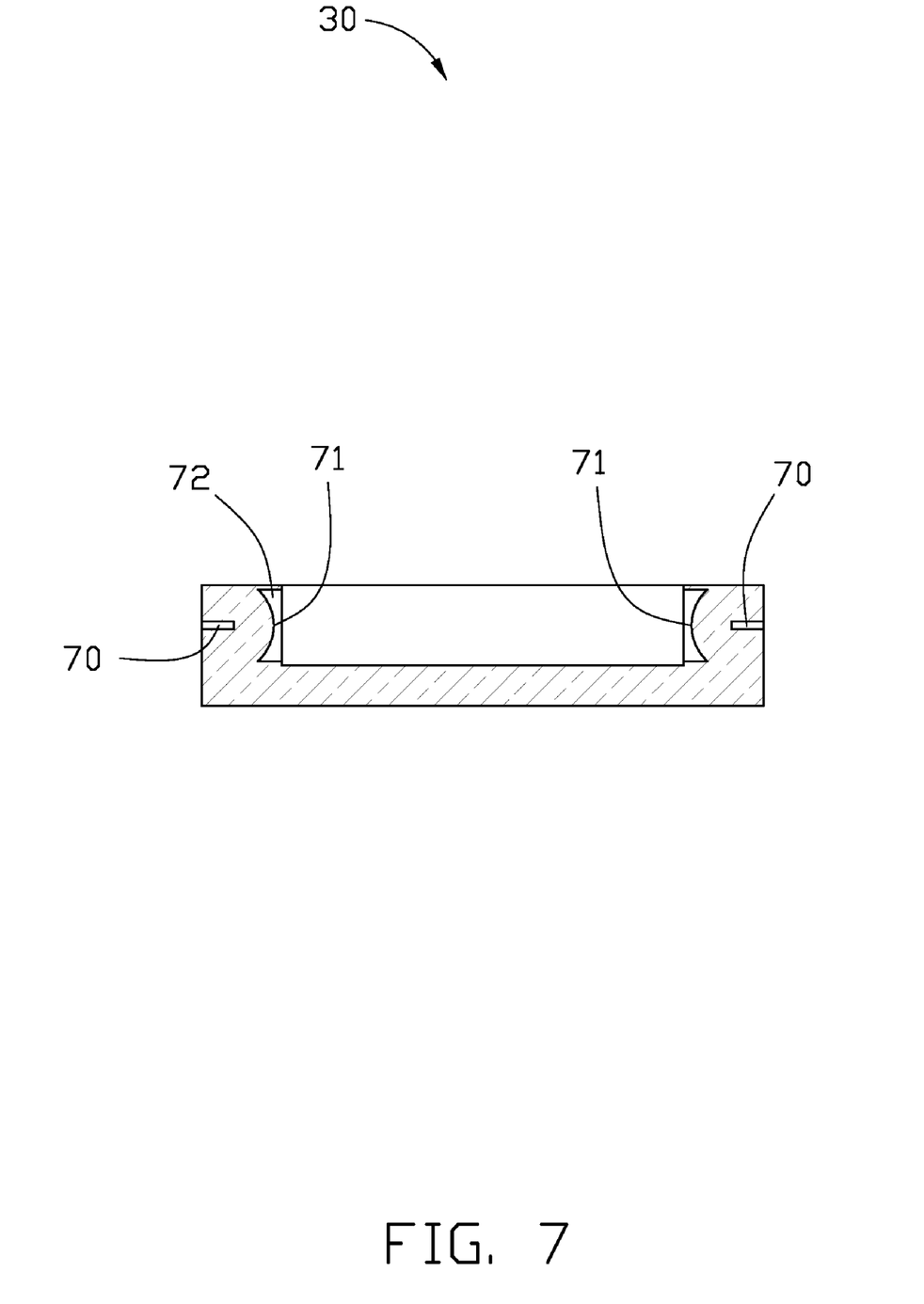
FIG. 7 is a cross-sectional view of the socket shown in FIG. 5, taken along the line VII-VII.
Figure 8:
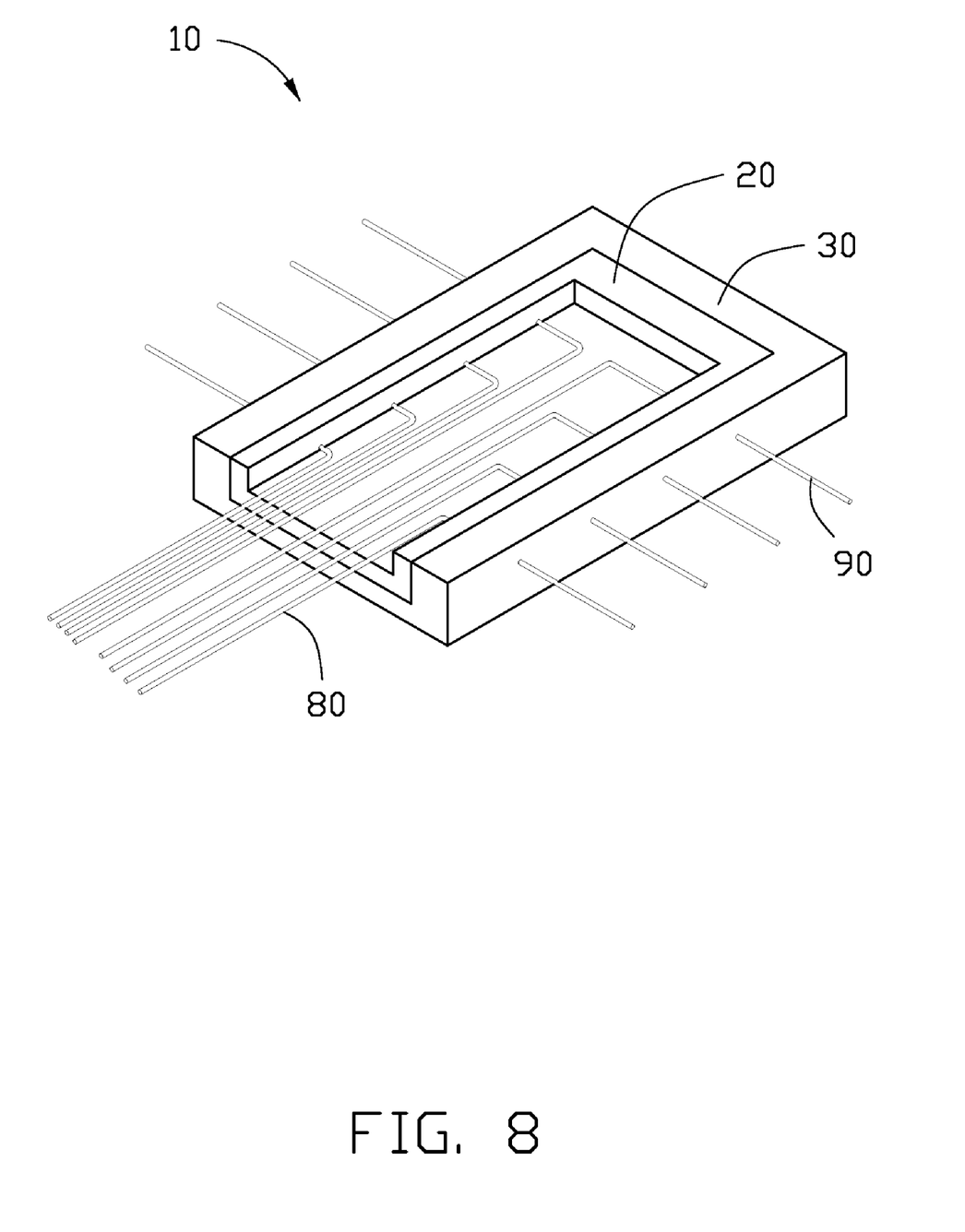
FIG. 8 is a schematic view showing optical fibers connected by the connectors of FIG. 1.

In application, the plug 20 is received in the second receiving space 35 of the socket 30, with the first converging lenses 51 aligning with and facing directly the respective second converging lenses 71. Referring also to FIG. 7, a plurality of first optical fibers 80 to be connected can be received in the first receiving space 25 of the plug 20, with ends thereof engaged in the respective first fiber engaging holes 50 of the plug 20; and a plurality of second optical fibers 90 to be connected can be engaged with the second engaging holes 70 of the socket 30. In this way, the first optical fibers 80 are optically connected to the respective second optical fibers 90 by the respective first and second converging lenses 51, 71. That is, the socket 30 and the plug 20 not only provide mechanical structures (the first and second fiber engaging holes 50, 70), but also provide optical structures (the first and second converging lenses 51, 71) to connect the first optical fibers 80 to the second optical fibers 90.

Use of the present connector allows for more than one pair of optical fibers without increasing transmission loss and in fact it may decrease light transmission loss due to the first and second converging lenses 51, 71.

In other embodiments, the first and second converging lenses 51, 71 can be also mounted to holes formed in the corresponding sidewalls, such holes are in communication with the corresponding first and second fiber engaging holes 50, 70.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. An optical fiber connector, comprising a socket and a plug for insertion in the socket, wherein the plug comprises a first sidewall, an opposite second sidewall, a plurality of first fiber engaging holes formed in each of the first and second sidewalls, and a plurality of first converging lenses located in each of the first and second sidewalls, aligning with the respective first fiber engaging holes; the socket comprises a fourth sidewall, an opposite fifth sidewall, a plurality of second fiber engaging holes formed in each of the fourth and fifth sidewalls, and a plurality of second converging lenses located in each of the fourth and fifth sidewalls, aligning with the respective second fiber engaging holes; and the first converging lenses align with and directly face the respective second converging lenses.

2. The optical fiber connector as described in claim 1, wherein the plug further comprises a third sidewall interconnecting the first and second sidewalls, and a first bottom wall interconnecting the first, second and third sidewalls, the socket further comprises a sixth sidewall interconnecting the fourth and fifth sidewalls, and a second bottom wall interconnecting the fourth, fifth and sixth sidewalls, the first, second, third sidewalls and the first bottom wall cooperatively define a first cavity for receiving a plurality of optical fibers; the fourth, fifth, sixth sidewalls and the second bottom wall cooperatively define a second cavity for receiving the entire plug.

3. The optical fiber connector as described in claim 2, wherein the first, second, fourth and fifth sidewalls are parallel with each other and are perpendicular to the third and sixth sidewalls.

4. The optical fiber connector as described in claim 1, wherein an end of each of the first fiber engaging holes is located at a focus of the corresponding first converging lens; and an end of each of the second fiber engaging holes is located at a focus of the corresponding second converging lens.

5. The optical fiber connector as described in claim 1, wherein the first converging lenses are integrally formed with the plug; and the second converging lenses are integrally formed with the socket.

6. The optical fiber connector as described in claim 5, wherein each of the first and second converging lenses is a convex lens with a single convex surface.

7. The optical fiber connector as described in claim 1, wherein each of the first and second converging lenses is located within a hole formed in the corresponding plug and socket.

8. A connector for connecting optical fibers, the connector comprising:

a first part, the first part defining a first receiving space, and comprising a first sidewall, an opposite second sidewall, and a third sidewall interconnecting the first and second sidewalls, the first, second and third sidewalls cooperatively surrounding the first receiving space, the first and second sidewalls each comprising a plurality of first fiber engaging holes formed therein, and a plurality of first converging lenses located therein, aligning with the respective first fiber engaging holes, the first fiber engaging holes interconnecting the first receiving space, the first receiving space configured for receiving a plurality of optical fibers engaged to the first fiber engaging holes;

a second part, the second part defining a second receiving space, and comprising a fourth sidewall, an opposite fifth sidewall, and a sixth sidewall interconnecting the fourth and fifth sidewalls, the fourth, fifth and sixth sidewalls cooperatively surrounding the second receiving space, the fourth and fifth sidewalls each comprising a plurality of second fiber engaging holes formed therein, and a plurality of second converging lenses located therein, aligning with the respective second fiber engaging holes, the first part being received in the second receiving space, the second converging lenses aligning with and directly facing the respective first converging lenses.

9. The connector as described in claim 8, wherein the first part further comprises a first bottom wall interconnecting the first, second and third sidewalls; the second part further comprises a second bottom wall interconnecting the fourth, fifth and sixth sidewalls.

10. The connector as described in claim 8, wherein the first, second, fourth and fifth sidewalls are parallel with each other and are perpendicular to the third and sixth sidewalls.

11. The connector as described in claim 8, wherein an end of each of the first fiber engaging holes is located at a focus of the corresponding first converging lens; and an end of each of the second fiber engaging holes is located at a focus of the corresponding second converging lens.

12. The connector as described in claim 8, wherein the first converging lenses are integrally formed with the first part; and the second converging lenses are integrally formed with the second part.

13. The connector as described in claim 12, wherein each of the first and second converging lenses is a convex lens with a single convex surface.

14. The connector as described in claim 8, wherein each of the first and second converging lenses is located within a hole formed in the corresponding first and second parts.

* * * * *